United States Patent
Mangla et al.

(10) Patent No.: US 12,120,632 B2
(45) Date of Patent: Oct. 15, 2024

(54) DYNAMIC MASSIVE MIMO END DEVICE PAIRING BASED ON PREDICTED AND REAL TIME CONNECTION STATE

(71) Applicant: International Business Machines Corporation, Armonk, NY (US)

(72) Inventors: Utpal Mangla, Toronto (CA); Saurabh Agrawal, Bangalore (IN); Dinesh C. Verma, New Castle, NY (US); Mathews Thomas, Flower Mound, TX (US); Sagar Tayal, Ambala (IN)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 17/968,642

(22) Filed: Oct. 18, 2022

(65) Prior Publication Data
US 2024/0129887 A1 Apr. 18, 2024

(51) Int. Cl.
*H04W 64/00* (2009.01)
*H04B 7/0413* (2017.01)
*H04B 17/336* (2015.01)
*H04W 16/28* (2009.01)

(52) U.S. Cl.
CPC ........ *H04W 64/006* (2013.01); *H04B 7/0413* (2013.01); *H04B 17/336* (2015.01); *H04W 16/28* (2013.01)

(58) Field of Classification Search
CPC ... H04B 7/0413; H04B 17/336; H04W 16/28; H04W 64/006
See application file for complete search history.

(56) References Cited

U.S. PATENT DOCUMENTS

| | | |
|---|---|---|
| 8,914,015 B2 | 12/2014 | Kim et al. |
| 9,392,607 B2 | 7/2016 | Huang et al. |
| 10,148,332 B2 | 12/2018 | Stirling-Gallacher et al. |
| 10,218,416 B2 | 2/2019 | Silverman et al. |
| 10,277,428 B2 | 4/2019 | Shen et al. |
| 10,602,478 B1 | 3/2020 | Marupaduga et al. |
| 10,716,124 B1 | 7/2020 | Marupaduga et al. |
| 10,771,128 B1 | 9/2020 | Sitaram et al. |
| 2004/0114618 A1 | 6/2004 | Tong et al. |
| 2017/0104568 A1* | 4/2017 | Nasiri Khormuji .. H04L 5/0048 |
| 2018/0076937 A1* | 3/2018 | Nasiri Khormuji .. H04L 5/0073 |

(Continued)

FOREIGN PATENT DOCUMENTS

| | | |
|---|---|---|
| CN | 106471746 A | 3/2017 |
| CN | 107431590 A | 12/2017 |

OTHER PUBLICATIONS

Wikipedia, "MIMO," Wikipedia, 2022, 15 pages, retrieved from https://en.wikipedia.org/wiki/MIMO.

(Continued)

*Primary Examiner* — David B Lugo
(74) *Attorney, Agent, or Firm* — Zilka-Kotab, P.C.

(57) ABSTRACT

A computer-implemented method for grouping devices in a massive multiple-input and multiple-output (MIMO)-based cellular network, in accordance with one embodiment, includes determining movement states of end devices in a cell of the massive MIMO-based cellular network, estimating payload requirements of the end devices, and grouping the end devices in a group based on the determined movement states and the estimated payload requirements.

15 Claims, 6 Drawing Sheets

(56) References Cited

U.S. PATENT DOCUMENTS

| | | | | |
|---|---|---|---|---|
| 2021/0321423 A1* | 10/2021 | Kuchi | ................... | H04W 72/51 |
| 2022/0232579 A1* | 7/2022 | Lee | ........................ | H04L 67/30 |
| 2022/0394433 A1* | 12/2022 | Xu | ......................... | H04W 8/24 |
| 2023/0155905 A1* | 5/2023 | Riedl | ................... | H04L 43/062 |
| | | | | 709/224 |
| 2023/0262491 A1* | 8/2023 | Seck | ................... | H04L 41/0663 |
| | | | | 370/252 |

OTHER PUBLICATIONS

Kinney, S., "What is massive MIMO?" RCRWireless News, Jun. 28, 2017, 2 pages, retrieved from https://www.rcrwireless.com/20170628/5g/what-is-massive-mimo-tag17-tag99.

Chen et al., "Massive MIMO Beamforming With Transmit Diversity for High Mobility Wireless Communications," IEEE Access, vol. 5, Oct. 24, 2017, pp. 23032-23045.

Dizdar et al., "Rate-Splitting Multiple Access to Mitigate the Curse of Mobility in (Massive) MIMO Networks," IEEE Transactions on Communications, vol. 69, No. 10, Oct. 2021, pp. 6765-6780.

Jo et al., "Mobility Management Based on Beam-Level Measurement Report in 5G Massive MIMO Cellular Networks," Electronics, vol. 9, 2020, pp. 1-16.

Annamalai et al., "UE Grouping Algorithms to Maximize Frequency Sharing in Hybrid IBFD Networks," IEEE Transactions on Wireless Communications (Early Access), Jun. 6, 2022, 16 pages, retrieved from https://ieeexplore.ieee.org/document/9789219.

International Search Report and Written Opinion from PCT Application No. PCT/CN2023/108570, dated Sep. 15, 2023, 7 pages.

Samsung, "On Physical Layer Procedures for NR V2X," On Physical Layer Procedures for NR V2X, Oct. 2019, 22 pages, retrieved from https://www.3gpp.org/dynareport?code=TDocExMtg-R1-98--32826.htm.

* cited by examiner

| Date | Day | Time | | | | | | | Predictability |
|------|-----|------|---|---|---|---|---|---|----------------|
| | | 6:00 | 7:00 | 8:00 | 9:00 | 10:00 | 11:00 | 12:00 | |
| 2-Apr | Saturday | No Movement | | | | Ultra-Fast Movement | | No Movement | Unpredictable for certain interval |
| 3-Apr | Sunday | No Movement | | | | | Medium movement | No Movement | Predictable |
| 4-Apr | Monday | No Movement | No Movement | | Medium movement | No Movement | No Movement | | Predictable |
| 5-Apr | Tuesday | | No Movement | | Medium movement | No Movement | No Movement | | Predictable |
| 9-Apr | Saturday | Movement | | No Movement | | Ultra-Fast Movement | | No Movement | Unpredictable for certain interval |
| 10-Apr | Sunday | | No Movement | | Medium movement | | Medium movement | No Movement | Predictable |
| 11-Apr | Monday | No Movement | | | Medium movement | | No Movement | | Predictable |
| 12-Apr | Tuesday | No Movement | | | Medium movement | | No Movement | | Predictable |

DYNAMIC MASSIVE MIMO END DEVICE PAIRING BASED ON PREDICTED AND REAL TIME CONNECTION STATE

BACKGROUND

The present invention relates to massive Multiple-Input and Multiple-Output (MIMO), and more specifically, this invention relates to dynamic massive MIMO end device pairing based on predicted and real time connection state.

Massive MIMO is an important technology to enable 5G and future wireless technology for enhancing end device and radio cell capacities, in part due to the effective time/frequency resources utilization by incorporating Multiple User-MIMO (MU-MIMO) mode. The use of multiple radio antennas enables the directing of beams toward diverse end devices, with each beam spatially countering the interference from the other beams. This in turn leads to higher connection capacities for base stations.

In Massive MIMO, it is assumed that the number of transmit antennas are receive antennas are high. Such a massive number of antennas would provide significant multiplexing and diversity gains and serve a larger number of users in parallel. By increasing the number of transmit antennas, a higher data-rate can be achieved without increasing bandwidth. That is because, by adding multiple antennas, a greater degree of freedom, in addition to time and frequency dimensions, in wireless channels can be offered to provide a higher data-rate.

Moreover, Massive MIMO along with beamforming tends to minimize intra- and inter-cell interference by narrowing and focusing the radiated energy toward the intended user's direction.

There are two distinct MIMO cases: transmit diversity where the same data is transmitted by multiple antennas simultaneously to boost Signal to Interference and Noise Ratio (SINR), and spatial multiplexing where independent data streams are sent on each antenna to increase capacity. Thus, practically, massive MIMO holds promise of significantly increasing capacity and service enhancements in cellular network environments. However, capacity and service enhancement depend closely on the end device movement state, payload requirement, and the channel quality perceived by the end device. Because capacity of the cell and service enhancement can only be enhanced by grouping the end users, but the number of increased users not following orthogonality can lead to interference, the perceived service quality is often reduced.

In a real environment, some end devices have a relatively no movement state while others may have a higher movement state. The current design of MU-MIMO working methodology is very sensitive to the end device movement state and as a result the capacity gains and service enhancements are very negatively impacted due to high movement states of end devices.

Another issue arises when some end devices have a limited user plane payload requirement while others have higher user plane payload requirements. As per the current design, performance of MU-MIMO is relatively reduced in the low payload scenarios; thus, traffic has to be considered for MU-MIMO efficiency.

Another case revolves around the end device perceived channel signal quality at cell edge locations or in interference areas due to multiple servers. For different end devices, quality may vary due to the varying path loss, receiver sensitivity, or the type of device being used. Each end device may have different capability, such as which particular carrier is supported, signal receiving sensitivity, etc. Since channel estimation may not be optimal in this case, the wrong MIMO mode may be selected. Due to this, although the capacity of the radio cell would be significantly increased, the service experience may become unacceptable in this massive MIMO scenario.

Channel orthogonality between multiple end devices is an important criterion to create user separability and allow for the opportunity to share radio frequency resources simultaneously. With mobility there is an added demand to adjust beamforming weight assignments to not only maintain signal power levels at the user end (e.g., beam quality), but also to continuously limit the inter user interference experienced between users assigned with the same radio resource allocations. Schedulers will also fail to realize potential multiplexing gains as fewer radio resource blocks are shared between users within the same cell, reducing spectral efficiency.

In situations where MU-MIMO end device pairing is not done optimally, typical effects include higher signaling, non-optimal radio resource control (RRC) message flow, battery drainage, performance degradation, SRS resource drainage, etc.

SUMMARY

A computer-implemented method for grouping devices in a massive multiple-input and multiple-output (MIMO)-based cellular network, in accordance with one embodiment, includes determining movement states of end devices in a cell of the massive MIMO-based cellular network, estimating payload requirements of the end devices, and grouping the end devices in a group based on the determined movement states and the estimated payload requirements.

A computer program product, in accordance with one embodiment, includes one or more computer readable storage media, and program instructions collectively stored on the one or more computer readable storage media. The program instructions include program instructions to perform the foregoing method.

A system, in accordance with one embodiment, includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamic massive MIMO end device pairing based on predicted and real time connection state.

In one general embodiment, a computer-implemented method for grouping devices in a massive multiple-input and multiple-output (MIMO)-based cellular network includes determining movement states of end devices in a cell of the massive MIMO-based cellular network, estimating payload requirements of the end devices, and grouping the end devices in a group based on the determined movement states and the estimated payload requirements.

In another general embodiment, a computer program product includes one or more computer readable storage media, and program instructions collectively stored on the one or more computer readable storage media. The program instructions include program instructions to perform the foregoing method.

In another general embodiment, a system includes a processor and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
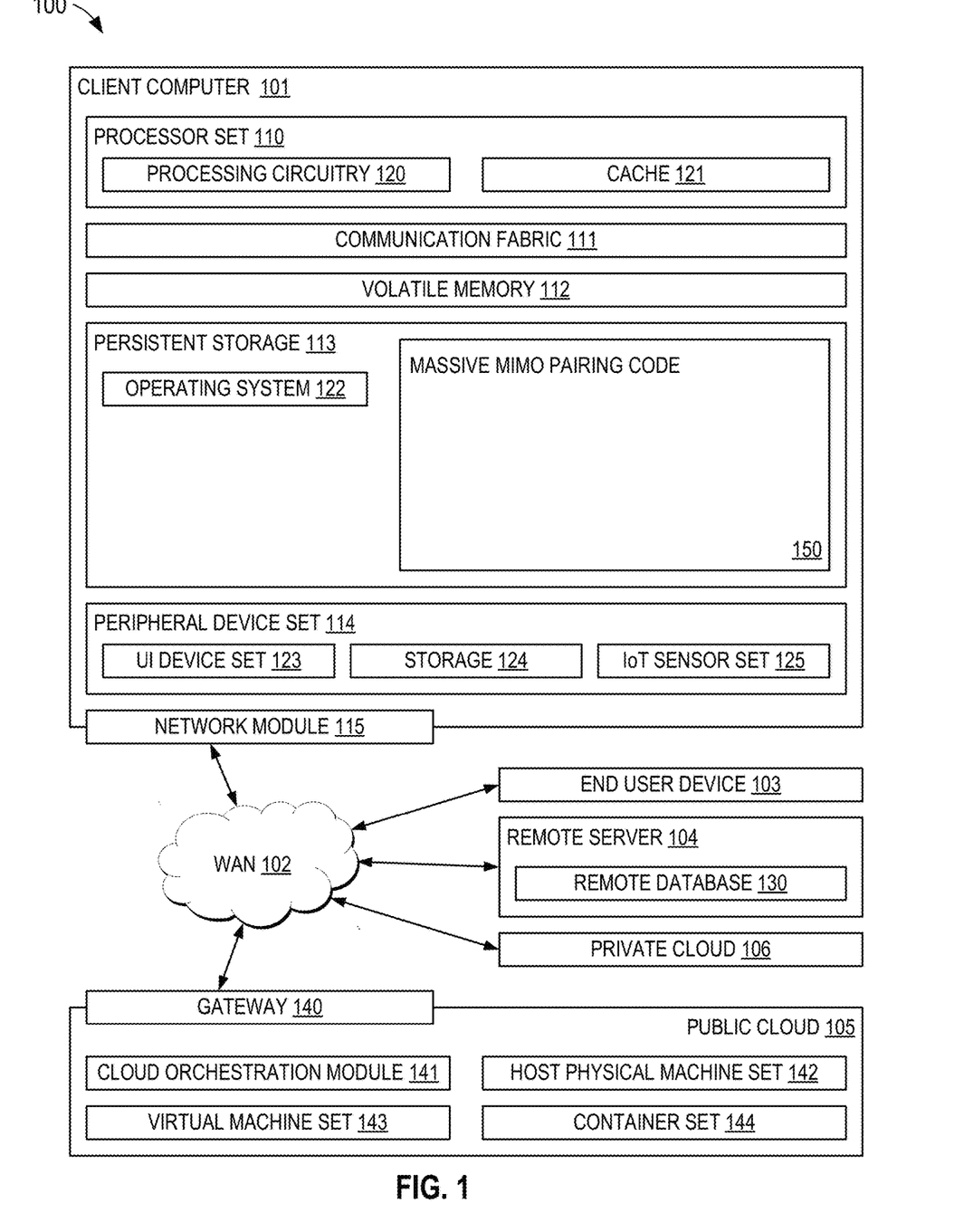
FIG. 1 is a diagram of a computing environment, in accordance with one embodiment of the present invention.

Computing environment 100 contains an example of an environment for the execution of at least some of the computer code involved in performing the inventive methods, such as massive MIMO pairing code 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

Various embodiments described herein are implemented in conjunction with massive MIMO, e.g., to serve multiple end devices using the same resources. Any configuration of a known massive MIMO network may be adapted according to the teachings herein, including known types of massive MIMO-based cellular networks. In various embodiments, the number of end devices connecting to a base station is much less than the number of antennas coupled to the base station. Beamforming of known type is used to enhance communication between the base station and an end device. The end devices may be any type of device capable of connecting to the network, such as a cellular telephone, a tablet, a smart watch, a mobile hotspot, etc.

To support massive MIMO, there is need for effective end device pairing along with beamforming solutions, and these actions should be intelligently executed at a lower hierarchy of the radio base station protocol stack. In the current state of the art, there is no efficient way to predict end device movement state at base stations; thus, all end devices in the coverage area of base station cells are treated equally irrespective of their movements. Moreover, currently at base stations, there is no efficient way to predict end device payload requirements, as base stations provide the physical resource blocks (PRBs) or similar attributes for mapping the payload and service but cannot determine the amount and bursts of traffic which may be needed from the end devices and/or their applications. In addition, base stations currently do not have a central entity which has the capability to analyze and accordingly push traffic onto a neighboring cell, nor has the capability to pull traffic from a neighboring cell.

To optimize and automate the complex process of determining the correct set of end device grouping for effective massive MIMO implementations, various embodiments of the present invention enable an analytics layer supporting artificial intelligence (AI)/machine learning (ML) modeling and prediction learning at a higher layer, with inference capability at a lower layer of autonomous control loop operations. This higher layer may have end device specific information regarding predicted movement state, traffic requirement on the user plane, beamforming management, and cell edge end user quality with end device capabilities. In some approaches, such information is fed to an analytics engine, which helps in predicting the configuration dynamically when aggregated, and thus assists the base station to select the optimal end device grouping in near to real time. A higher layer training model may make decisions on the end device grouping to optimize the same. Beam optimization via optimal end device grouping leads to enhance the massive MIMO system performance, and thus lower protocol layers of the base station can perform the effective scheduling mechanism.

Figure 2:
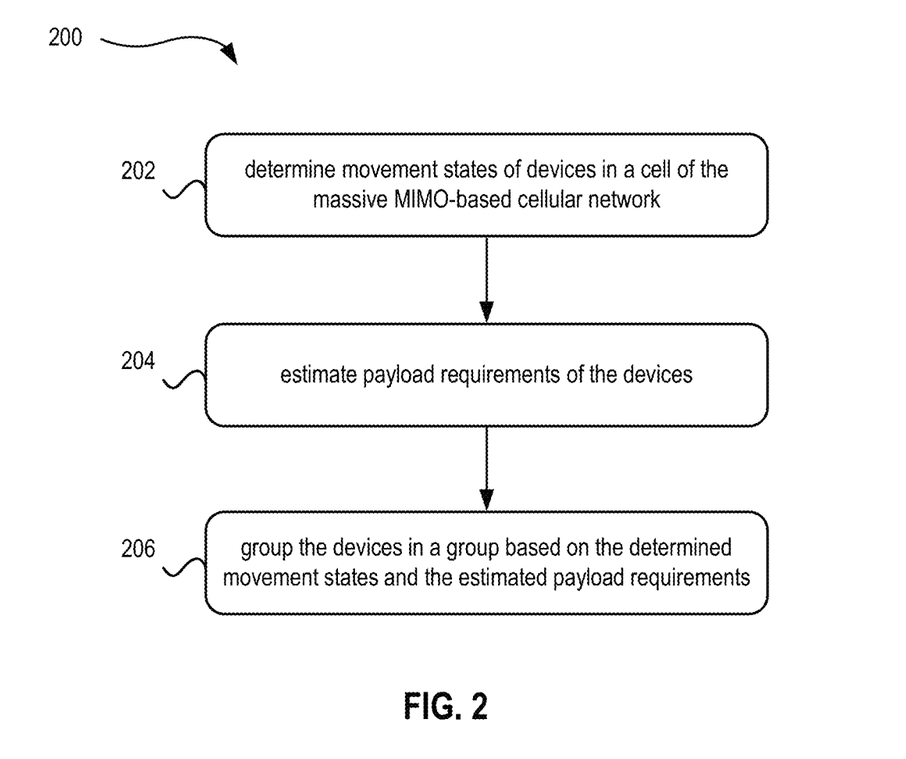
FIG. 2 is a flowchart of a method, in accordance with one embodiment of the present invention.

Now referring to FIG. 2, a flowchart of a method 200 for grouping end devices in a massive MIMO-based cellular network is shown according to one embodiment. The method 200 may be performed in accordance with the present invention in any of the environments depicted in FIG. 1, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a massive MIMO-based cellular network, component thereof, or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2, method 200 may initiate with operation 202, where movement states of end devices in a cell of the massive MIMO-based cellular network are determined. In operation 204, payload requirements of the end devices are estimated. In operation 206, the end devices are grouped in a group based on the determined movement states and the estimated payload requirements. Once the group(s) are created, system resources may be allocated to the end devices in each group in any manner that would become apparent to one skilled in the art after reading the present disclosure. More details about each these operations are provided below, including exemplary embodiments, as well as how the grouping is used in the network.

In a preferred embodiment, the movement states of end devices are collected, e.g., at predetermined intervals, continuously, according to a predefined schedule, upon occurrence of an event, etc. Preferably, the movement states are collected at a higher hierarchy layer of the system performing the method.

Figure 3:
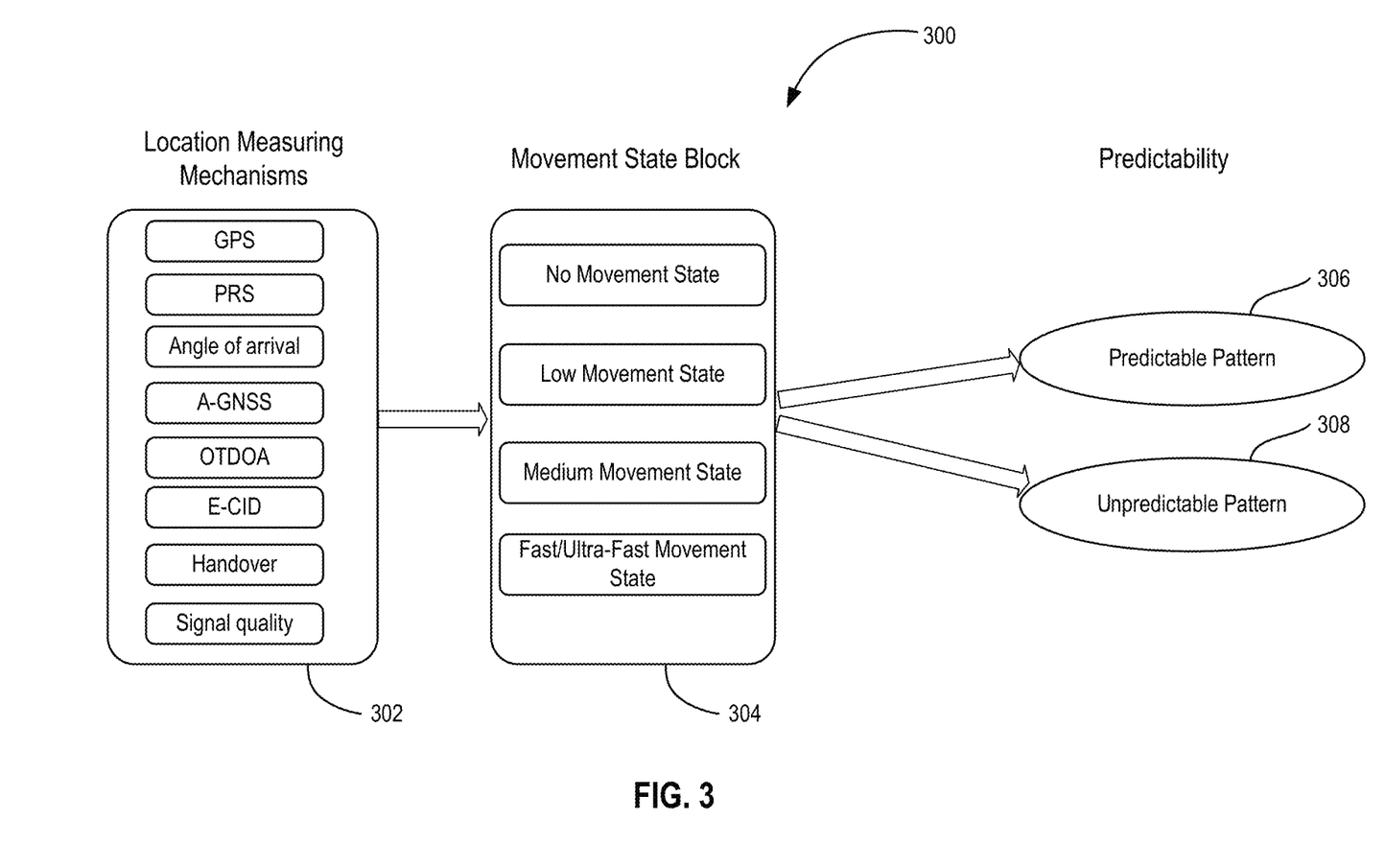
FIG. 3 depicts an architecture for assessing movement state of an end device, in accordance with one embodiment.

FIG. 3 depicts an architecture 300 for assessing movement state of an end device, in accordance with one embodiment. As an option, the present architecture 300 may be implemented in conjunction with features from any other embodiment listed herein, such as those described with reference to the other FIGS. Of course, however, such architecture 300 and others presented herein may be used in various applications and/or in permutations which may or may not be specifically described in the illustrative embodiments listed herein. Further, the architecture 300 presented herein may be used in any desired environment.

Information regarding the locations of the end devices (which can be outdoor and/or indoor) can be collected on basis of any known location measuring mechanism 302. Illustrative location measuring mechanisms include:

GPS
Positioning Reference Signal (PRS)
Triangulation method
Handover count between radio cells
Beam configuration change at MAC layer
Coverage/quality change
Angle of arrival
Timing advance
Enhanced Cell ID (E-CID)
Observed Time Difference Of Arrival (OTDOA)
Assisted Global Navigation Satellite System (A-GNSS)
Handover.

Location measuring mechanism information is fed into the movement state block 304, which has the role of determining and grouping the end devices on the basis of their movement state. By considering the movement states of the end devices, the problem of an end device in a group moving and thus changing the signal characteristics such that the end device now interferes with communications of another end device in the group can be reduced.

In some approaches, each end device is distinguished on the basis of one of a plurality of predefined states. The predefined states may represent different movement states of an end device, according to any distinction desired. An illustrative set of movement states, presented by way of example only, follows.

No Movement state: These end devices are classified as devices with no or minimal movement. Illustrative end devices typically having no movement state include smart meter Internet of Things (IOT) devices, static user devices, etc.

Low Movement state: These end devices are classified as devices with relatively low speed movement, which means their perceived conditions are slowly changing which in turn means that there will not be abrupt channel condition changes from end devices. Illustrative end devices typically having no movement state are those associated with pedestrian traffic, devices used within a single building, etc.

Medium movement state: These end devices are classified as devices with moderate speeds and/or that may be accessing higher user plane traffic. Such end devices may be associated with sudden channel condition changes on a reported channel toward the base station. Illustrative end devices that may have a medium movement state include autonomous cars in cities, etc.

High and ultra-fast movement state: These end devices are classified as devices with high or very high speeds and so are bound to report sudden network conditions change. They are also bound to miss the signaling reception due to poor channel quality. Illustrative end devices that may have a medium movement state include devices on fast moving trains, devices in cars on a freeway, etc.

Movement state can be further distinguished on the basis of predictability, e.g., as a predictable pattern 306 or an unpredictable pattern 308. For instance, the movement states of the end devices may be characterized based on predictability of patterns of movement of the end devices. Accordingly, in some embodiments, end devices with predictable patterns of movement may be grouped while end devices with unpredictable patterns of movement are not placed in the group, e.g., are placed in another group with lower priority, serviced according to default parameters (e.g., best efforts), etc.

Regarding a predictable pattern, as per the movement state classification, end devices can be determined as following predictable patterns if, on the basis of a predefined granularity such as time, day, etc., a particular end device ID follows certain trends and/or patterns. For example, an end device of an office-going employee may exhibit a trend in which the end device is in a no movement state for certain hours and certain days, with different patterns on weekends.

When such patterns are observed, at least some of the time slots can be classified as predictable patterns. Further the predictability can be leveraged to assist the base station in scheduling resources, e.g., end devices having predictable patterns can be given higher priority for base station resources at least during periods of predictable movement state.

Regarding unpredictable patterns, as per the movement state classification, if end devices do not follow movement state patterns over the different time granularity, then those cases are identified as unpredictable traffic. Preferably, such end devices are not placed in the priority group, but rather grouped separately and are served according to a default service plan, e.g., resources are scheduled on a best effort basis.

A model may be trained in known manner with exemplary trends and/or patterns of any desired type, and that model used with AI or ML to determine whether to classify the movement state of an end device.

Figure 4:
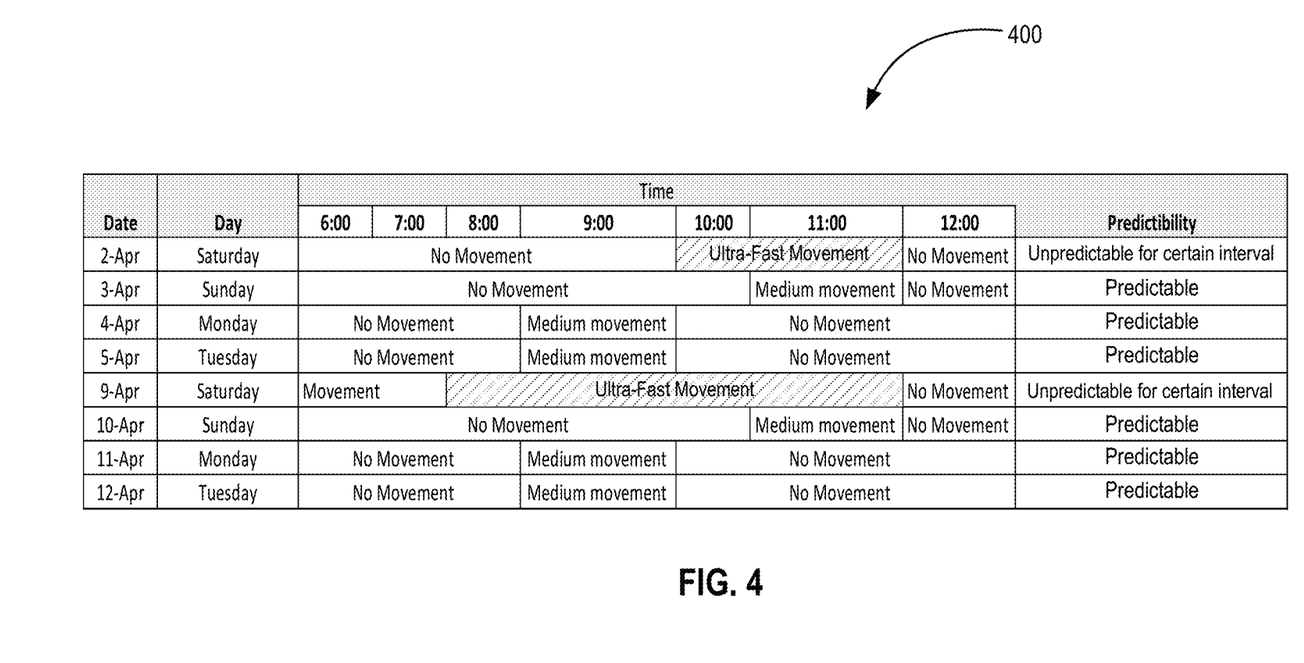
FIG. 4 depicts a table correlating observations of movement state to time of day, and the corresponding label of predictable or unpredictable, in accordance with one embodiment.

Continuing with the office-going worker example above, reference is made to FIG. 4, which is an exemplary table 400 correlating observations of movement state to time of day, and the corresponding label of predictable or unpredictable, where the unpredictable period is denoted for a certain interval. As noted, movement during weekdays within the given time period is predicable, while both Saturdays have periods of unpredictable movement state. Based on these observations, the movement state of the end device may be predicted to have a predictable movement state in all time periods shown in the table except Saturdays from 8:00 to 12:00, and whether the end device is grouped in a particular group during a particular time period can be made based on such predictions.

Referring again to operation 204 of FIG. 2, the method may include collection of end device payload requirements, preferably at a higher hierarchy layer. The collection may be performed e.g., at predetermined intervals, continuously, according to a predefined schedule, upon occurrence of an event such as the end device connecting to a base station, etc.

The payload requirements may be estimated, at least in part, based upon factors such as applications currently running on the respective end devices, information about past usage, information about past payload requirements, etc.

Payload information collected may include the end device consumer application usage and/or payload/service patterns. The payload and/or service patterns may reflect payload and/or service requirements over time and/or in particular geographic locations. For example, a cell having an office building therein may see higher payloads used by end devices in the vicinity of the building during office hours. Similarly, a particular user may stream movies on his or her mobile phone at home in the evenings, creating a pattern of higher payload requirements during certain hours, also with a geographic correlation to the user's home. Generating a good payload profile is useful, as Multiuser MIMO has higher efficiency for higher payload requirements/requests.

Payload profiles may be created for the end devices based on current device information such as active applications and/or by collecting device payload patterns over time. For example, payload profiles may be created by considering applications and end device usage patterns by checking PRB, RRC, Physical Downlink Shared Channel (PDSCH), and/or Physical Downlink Control Channel (PDCCH) patterns. The payload profiles of the end devices may be used for the grouping.

Illustrative traffic profile classifications are listed immediately below.

Burst Payload: Certain applications for end devices may have an immediate surge in payload requirement, and then the payload requirement may subside. Such type of traffic requirement is inconsistent and accordingly the end device may be placed in a group with a higher hierarchy to maintain the state.

Low grade Payload: Certain traffic requirement may require minimal payload like browsing websites, accessing certain applications, streaming, etc. which in turn means that end devices may not have higher throughput requirements. Accordingly, the end device may be placed in a group with a lower hierarchy, and the state will be sufficiently maintained.

High grade Payload: Certain end user applications may have consistent requirement of higher traffic Service Level Agreements (SLAs) like higher throughput requirement/ additional capacity so the end device may be placed in a group with a higher hierarchy to maintain state.

The payloads and/or payload profiles may be used to group end devices into a group that optimizes system resources. For example, if one end device is streaming a movie and another is simply retrieving email every few minutes, the grouping algorithm may consider the expected relative resource needs of the end devices and place the end devices into groups so as to maximize data throughput without overloading the base station(s) to which connected, nor wasting resources by reserving bandwidth for an end device that needs only minimal data transfer.

Additional factors that may be considered when grouping the end devices include Signal to Interference and Noise Ratio (SINR) information and/or capabilities of the end devices. For example, the grouping may be performed using the movement states, the estimated payload requirements, the SINR information, and capabilities of the end devices. In another approach, some of the end devices may be grouped into a beamforming device group based on the SINR information and capabilities of the end devices.

SINR information and/or device capabilities may be collected from the end devices, e.g., at predetermined intervals, continuously, according to a predefined schedule, upon occurrence of an event, etc. Given that different channel quality requirements are set for different users depending on the application, this information may be collected to perform beamforming end device grouping, for example to achieve different SINRs over different end devices inside the same cell.

Another illustrative embodiment revolves around the end device perceived signal quality at cell edge locations and/or in interference-prone areas due to multiple servers, because quality may vary for different end devices due to the varying path loss, receiver sensitivity, and/or the type of device being used. For example, each end device may have a different capability (such as carriers supported, whether massive MIMO is compatible with the end device, etc.) and/or signal receiving sensitivity than others in the cell. Because channel estimation may not be optimal in this case, e.g., where a traditional phone in a group is not compatible with massive MIMO, the wrong MIMO mode may be selected. Due to this, although the capacity of the radio cell would be significantly increased, the service experience may become unacceptable in Massive MIMO. Accordingly, the desired SINR/channel quality is mapped to service capability. In some approaches, additional end device capabilities, such as frequency group indicator (FGI) bits, are collected and used in grouping.

In some embodiments, end devices located toward an edge of the cell are pushed out of the cell, or pulled into the cell, based on cell edge capacity requirements and a beamforming device buffer. For example, where cell edge capacity requirements for end device grouping are approaching or at a limit, an end device may be pushed to another grouping cell. Preferably, a communication is sent to a base station in the other cell with a request to assume communication with the end device. Similarly, when the beamforming device buffer is approaching or at a limit, an end device may be pushed to another cell's grouped end devices. Alternatively, where the cell edge capacity requirements and/or beamforming device buffer allow accommodation of another end device, an end device may be pulled into the cell grouped end devices.

In one approach, cell edge capacity requirements and/or beamforming end device buffer information are collected in the massive MIMO implementation. This information may be used as input to push/pull traffic at the cell edges, which helps to have effective massive MIMO operations. This can help to modify the configurations in near real time.

In addition, a grouped end device may be moved from the group to another group (including a group of ungrouped end devices) based on a change in one or more of the parameters listed herein, such as movement state, estimated payload requirement of the end device, SINR information, channel quality, etc.

Figure 5:
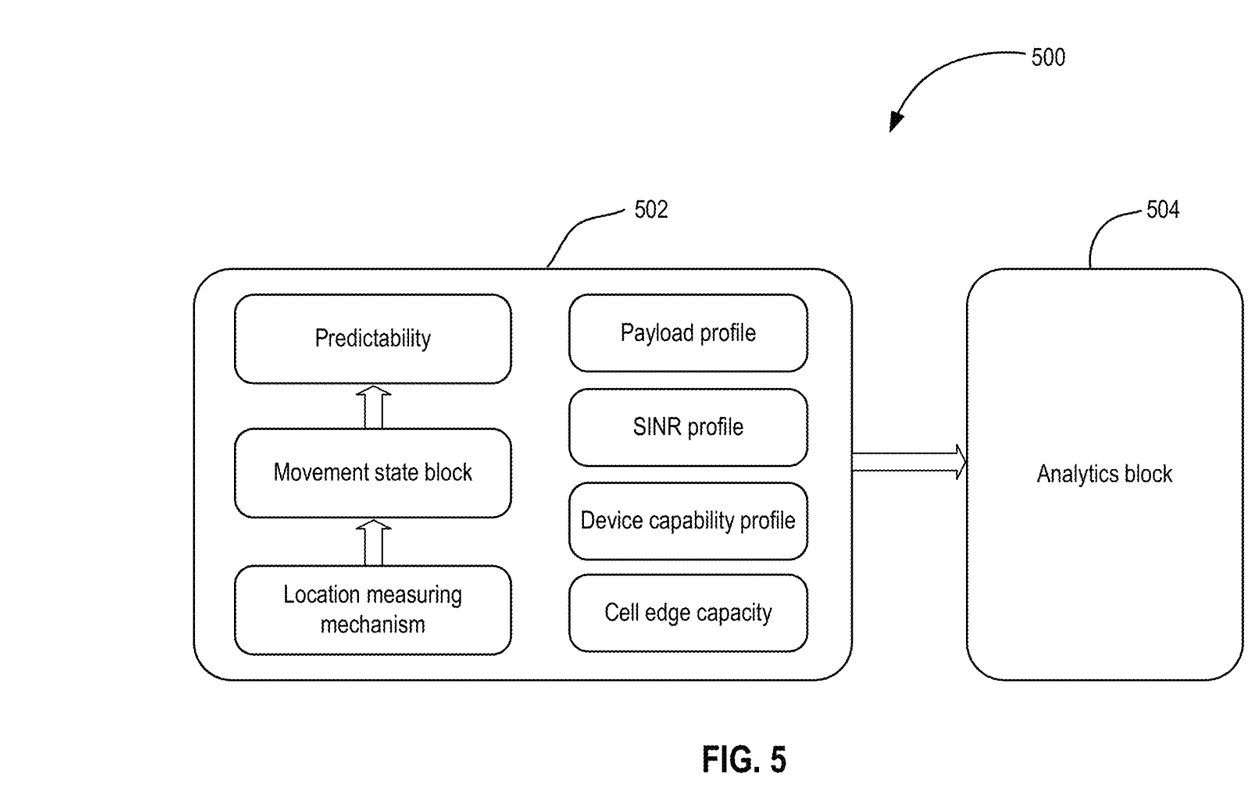
FIG. 5 depicts an analytics system and parameters fed into an analytics block, in accordance with one embodiment.

FIG. 5 depicts an analytics system 500 and parameters fed into an analytics block, in accordance with one embodiment. As an option, the present system 500 may be implemented in conjunction with features from any other embodiment listed herein, such as those described with reference to the other FIGS. Of course, however, such analytics system 500 and others presented herein may be used in various applications and/or in permutations which may or may not be specifically described in the illustrative embodiments listed herein. Further, the analytics system 500 presented herein may be used in any desired environment.

An information module 502 gathers some or all of the aforementioned information types. On the left hand side of the module, movement information is collected. In the approach shown, location information is gathered from location measuring mechanisms of the end devices. This information can be gathered in real time, over time, etc. The movement states of the end devices are determined, and the predictability of the movement states is characterized. Other information types collected by the module in this example include payload profiles of the end devices, SINR and channel quality profiles of the end devices, device capability profiles, and the cell edge capacity.

Some or all of the information gathered by the information module 502 is sent to analytics block 504 for analysis. The analytics block 504 identifies a group of end devices whose movement state is predictable and can be grouped as per location profile. The analytics block also considers payload profile requirement and end device capability, along with SINR/channel quality profiles to make the optimal grouping decision in view of resources availability at the base station.

Figure 6:
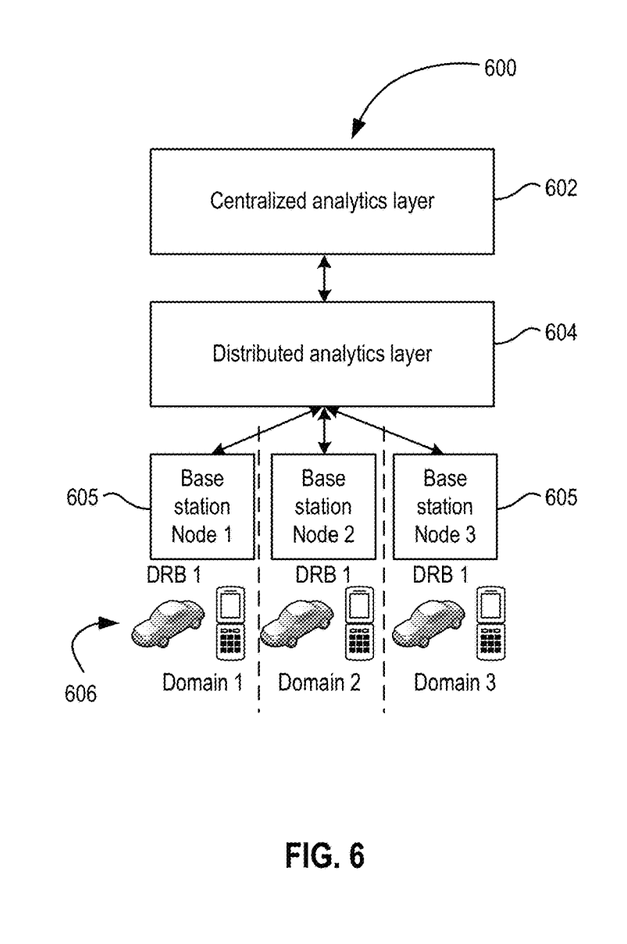
FIG. 6 depicts a massive MIMO system having multiple base stations and analytics layers, in accordance with one embodiment.
Figure 7:
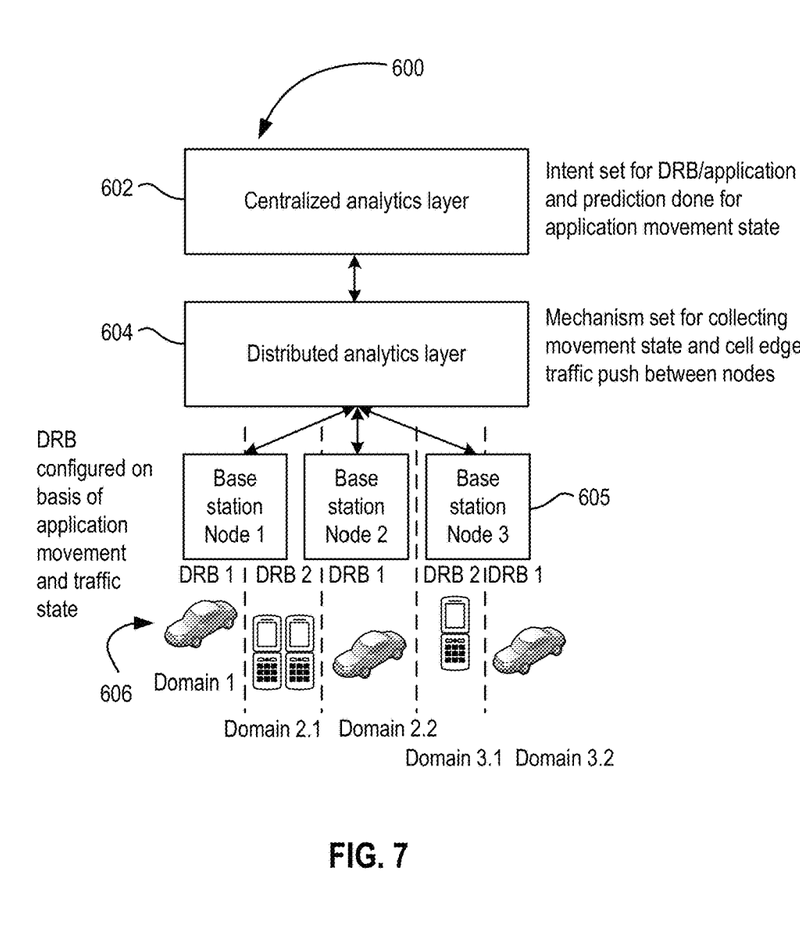
FIG. 7 depicts the massive MIMO system of FIG. 6 after end device groupings have been performed, in accordance with one embodiment.

FIG. 6 depicts a massive MIMO system 600 having multiple base stations and analytics layers, in accordance with one embodiment. FIG. 7 depicts the massive MIMO system 600 after device groupings have been performed effectively. As an option, the present system 600 may be implemented in conjunction with features from any other embodiment listed herein, such as those described with reference to the other FIGS. Of course, however, such analytics system 600 and others presented herein may be used in various applications and/or in permutations which may or may not be specifically described in the illustrative embodiments listed herein. Further, the analytics system 600 presented herein may be used in any desired environment.

Referring first to FIG. 6, a centralized analytics layer 602 is responsible for setting up the policy for the end device grouping as per serving different end device intended states, such as movement state, payload, device support capability, SINR profile, etc. The centralized analytics layer 602 may collect some of the information from multiple distributed layers so that it can make centralized decisions for each predicted end device. In some aspects, the distributed analytic layer 604 leverages the centralized analytics layer 602, which can help effect the seamless movement of end device grouping without additional measurement reports from the end devices, e.g., by getting assistance from policy prepared at the centralized analytics layer 602.

The distributed analytics layer 604 is responsible for assigning the different logical profiling on the basis of data radio bearer (DRB) by sending RRC reconfiguration messages. The distributed analytics layer 604 groups the end devices on the basis of different criteria, preferably obtained in real time, such as payload, movement information, location profiles, etc. The distributed analytics layer 604 groups also receive the policy from the centralized analytics layer 602, which is collecting and analyzing historical end device profiles such as movement state, payload usage, signal quality, device capability, etc.

End devices which meet the requirements for a particular group are grouped together. Many different groups can be created. Any ungrouped end devices are serviced with the default resource assignment (e.g., best efforts) from base station 605.

The analytics block 500 from FIG. 5 is placed in the centralized analytics layer 602, and has the capability to collect the information from multiple distributed layers so that it can make central decisions as per predicted end device states. In preferred embodiments, the analytics block 500 does not need additional end device measurements received from base stations 605 every time it wants to make some decisions. This in turn reduces signaling load and improves battery life of the end devices. Instead, the analytics block 500 leverages the analytic distributed layer 604, which can help with the seamless movement of end device groupings by getting instructions executed by the distributed analytics layer 604.

Once the grouping is performed by the higher hierarchy centralized analytics layer 602, the grouping criteria are sent to the distributed analytics layer 604 as per the trained model. The distributed analytics layer 604 has the responsibility of assigning the different profiles on the basis of DRB by sending RRC reconfiguration messages.

The distributed analytics layer 604 may group the end device on the basis of different criteria such as payload, movement, location profiles. Moreover, the grouping decision can be decided by the intent sent from the higher hierarchy centralized analytics layer 602.

The distributed analytics layer 604 also has functionality of redistribution of cell edge end devices on a common radio cell for effective end device grouping according to the information shared from the centralized analytics layer 602.

As shown in FIG. 7, the end devices 606 are grouped into groups in response to the groupings created by the distributed analytics layer 604. Note also that additional sub domains have been created, e.g., with DRB, in real time by grouping the end devices as per formulated policies received from the higher analytics layers 602, 604. In this example, the end devices 606 in Domains 1 and 2 of FIG. 6 include two vehicle-based devices having medium movement states and two user devices having low or no movement states. This configuration is inconsistent, and would likely result in interference, as well as network resources ultimately being blocked. Referring to FIG. 7, the two user devices have ben grouped together in Domain 2.1.

There has thus been described a unique proposition to formulate policies for end device grouping considering the movement state predictability, payload requirement state, grouping buffer and network quality at a higher analytics layer, then performing a Massive MIMO end device grouping strategy as per analyzed predictable and unpredictable patterns.

A massive MIMO network enhanced with the features presented herein not only increases capacity per cell, but also improves the end user experience by providing better and faster connections due to better utilization of network resources.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for grouping devices in a massive multiple-input and multiple-output (MIMO)-based cellular network, the method comprising:

determining movement states of end devices in a cell of the massive MIMO-based cellular network;

estimating payload requirements of the end devices; grouping the end devices into groups based on the determined movement states and the estimated payload requirements;

allocating resources of the massive MIMO-based cellular network to the groups;

communicating with the end devices in the groups via the massive MIMO-based cellular network;

pushing one of the end devices located toward an edge of the cell out of the cell based on cell edge capacity requirements and a beamforming device buffer; and sending a communication to a base station in another cell with a request to assume communication with the end device being pushed out of the cell.

2. The computer-implemented method of claim 1, comprising characterizing the movement states of the end devices based on predictability of patterns of movement of the end devices, wherein end devices with unpredictable patterns of movement are placed in one of the groups with relatively lower priority than other of the groups.

3. The computer-implemented method of claim 2, comprising collecting Signal to Interference and Noise Ratio (SINR) information from the end devices; and performing the grouping using the movement states, the estimated payload requirements, the SINR information, and capabilities of the end devices.

4. The computer-implemented method of claim 1, comprising creating payload profiles for the end devices by collecting device payload patterns over time; and using the payload profiles of the end devices for the grouping, wherein end devices having relatively higher estimated payload requirements are placed in a group with a higher hierarchy than other of the groups to maintain state.

5. The computer-implemented method of claim 4, comprising collecting Signal to Interference and Noise Ratio (SINR) information from the end devices; and performing the grouping using the movement states, the estimated payload requirements, the SINR information, and capabilities of the end devices.

6. The computer-implemented method of claim 1, wherein the payload requirements are estimated, at least in part, based upon applications running on the respective end devices.

7. The computer-implemented method of claim 1, comprising collecting Signal to Interference and Noise Ratio (SINR) information from the end devices, and grouping some of the end devices into a beamforming device group based on the SINR information and capabilities of the end devices.

8. The computer-implemented method of claim 1, comprising pulling a new end device located toward an edge of the cell into the cell based on cell edge capacity requirements and a beamforming device buffer.

9. The computer-implemented method of claim 1, comprising moving one of the end devices from one of the groups to another of the groups based on a change in movement state and estimated payload requirement of the end device.

10. A computer program product, the computer program product comprising:

one or more computer readable storage media, and program instructions collectively stored on the one or more computer readable storage media, the program instructions comprising:

program instructions to determine movement states of end devices in a cell of a massive MIMO-based cellular network;
program instructions to characterize the movement states of the end devices based on predictability of patterns of movement of the end devices;
program instructions to create payload profiles for the end devices by collecting device payload patterns over time;
program instructions to estimate payload requirements of the end devices based, at least in part, upon applications running on the respective end devices; and
program instructions to group the end devices in a group based on: the determined movement states, the estimated payload requirements, the payload profiles, and capabilities of the end devices,
wherein end devices with unpredictable patterns of movement are not placed in the group; and
program instructions to push one of the end devices located toward an edge of the cell out of the cell based on cell edge capacity requirements and a beamforming device buffer.

11. The computer program product of claim 10, comprising program instructions to collect Signal to Interference and Noise Ratio (SINR) information from the end devices; and performing the grouping using the movement states, the estimated payload requirements, the SINR information, and capabilities of the end devices.

12. The computer program product of claim 10, comprising program instructions to collect Signal to Interference and Noise Ratio (SINR) information from the end devices, and grouping some of the end devices into a beamforming device group based on the SINR information and capabilities of the end devices.

13. The computer program product of claim 10, comprising sending a communication to a base station in another cell with a request to assume communication with the end device being pushed out of the cell.

14. The computer program product of claim 10, comprising program instructions to pull a new end device located toward an edge of the cell into the cell based on cell edge capacity requirements and a beamforming device buffer.

15. A system, comprising:
a processor; and
logic integrated with the processor, executable by the processor, or integrated with and executable by the processor, the logic being configured to:
determine movement states of end devices in a cell of a massive MIMO-based cellular network;
estimate payload requirements of the end devices; and
group the end devices into groups based on the determined movement states and the estimated payload requirements;
allocate resources of the massive MIMO-based cellular network to the groups;
cause communication with the end devices in the groups via the massive MIMO-based cellular network;
push one of the end devices located toward an edge of the cell out of the cell based on cell edge capacity requirements and a beamforming device buffer; and
send a communication to a base station in another cell with a request to assume communication with the end device being pushed out of the cell.

* * * * *